United States Patent Office 3,362,178
Patented Jan. 9, 1968

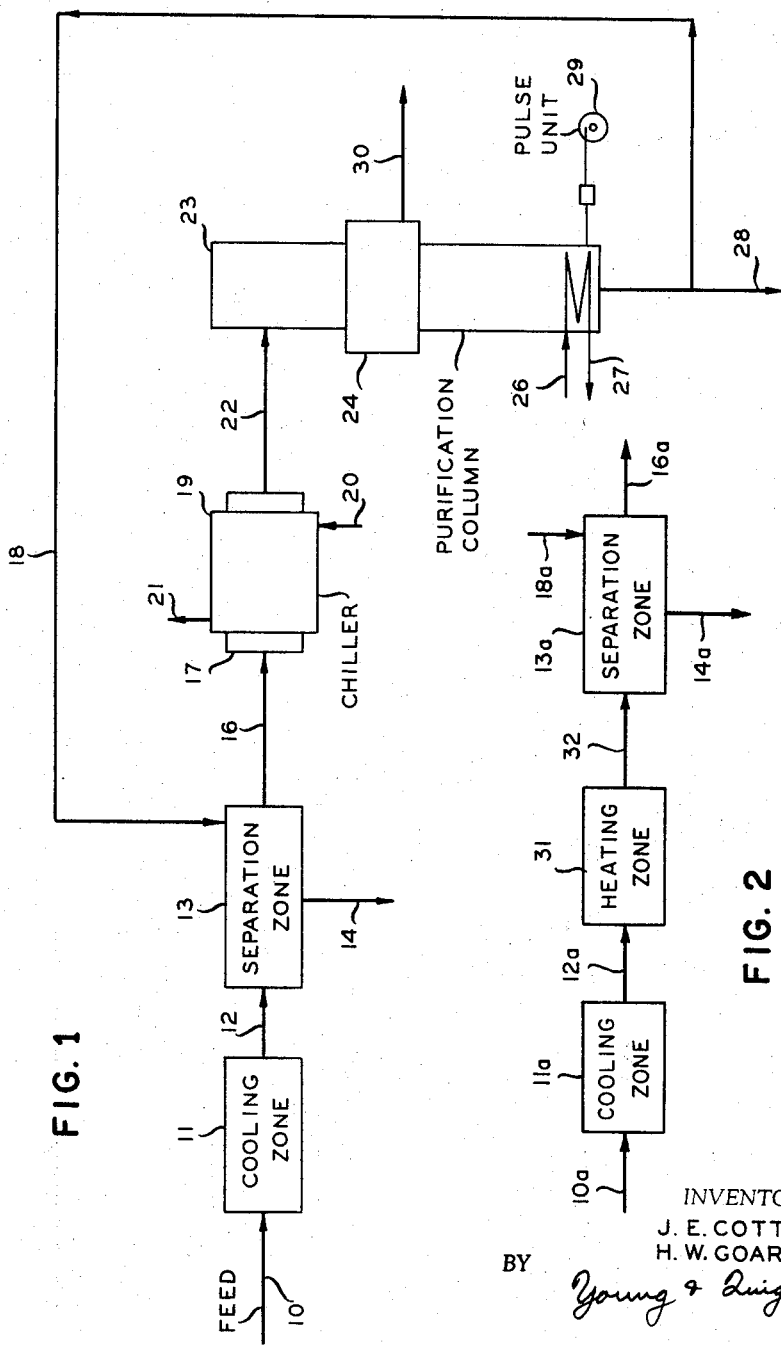

3,362,178
REMOVING INSOLUBLES FORMED ON
COOLING AQUEOUS MEDIUMS
John E. Cottle and Howard W. Goard, Bartlesville, Okla., assignors to Phillips Petroleum Company, a corporation of Delaware
Filed Jan. 3, 1964, Ser. No. 335,499
11 Claims. (Cl. 62—58)

ABSTRACT OF THE DISCLOSURE

An aqueous multi-component mixture containing at least one component which forms insolubles at a temperature slightly above the ice crystal forming temperature for the mixture, is cooled to a temperature slightly above the ice crystal forming temperature for the mixture to form said insolubles. The insolubles are separated from the remaining liquid and the remaining liquid is further cooled to form a slurry of ice crystals and mother liquor. The ice crystals are separated from the mother liquor, preferably in a fractional crystallization zone. In one embodiment a filter is utilized to separate the insolubles from the remaining liquid, and melt from the fractional crystallization zone is used to wash the filter.

---

The invention relates to a method and apparatus for concentrating aqueous solutions by crystallization. In another aspect, this invention relates to a crystallization method and apparatus wherein insolubles formed in an aqueous crystallization process are separated from the feed to the crystallization zone.

Conventionally, aqueous solutions can be concentrated by crystallization involving chilling the aqueous solution to form ice crystals with subsequent separation of the ice crystals from the mother liquor. This method as applied to the concentration of food products has become commercially acceptable as it can be carried out without damaging the taste of the food product. In this respect, concentration by crystallization represents a considerable improvement over evaporative processes which rely upon heat and/or extremely low pressures. The removal of water by evaporation also results in the removal of much of the essential oils and esters, many of which are not recoverable, so that the concentrated product can never be restored to its original freshness and flavor. Concentration by crystallization can be employed to advantage in the processing of such food products and beverages as milk, fruit juices, vegetable juices, vinegar, beer, wine, liquors and the like.

A method of concentration by crystallization involves chilling the aqueous solution in a chiller to form a slurry of ice crystals and mother liquor and then forcing the resulting slurry into a crystal purification column such as described in the patent to Schmidt, U.S. Re. 23,810, and the patent to R. W. Thomas, U.S. 2,854,494, and comprising an elongated confined concentration zone. The crystals are moved in a compact mass into a body of crystal melt which is formed by heating the crystals in a downstream portion of the concentration zone. A portion of the crystal melt is displaced back into the advancing crystal mass. The purification column includes an upstream liquid removal zone, a middle reflux zone, and a downstream melting zone. Mother liquor is removed from the crystals in the liquid removal zone and the crystals are melted in the melting zone.

It has been observed that in the concentration of beer by crystallization an organic material will precipitate out of the feed material ahead of the initial water freezing point. This amorphous material interferes with the subsequent separation of the beer concentrate and ice crystals by, for example, plugging filters employed to separate crystals and mother liquor. In a like manner, the concentration of grape juice by crystallization results in the precipitation of excess tartaric acid salts and of other suspended insoluble solids from the grape juice which interfere with the subsequent ice crystal forming process step and the separation of the formed ice crystals from the concentrated grape juice. These insoluble materials formed in an aqueous crystallization process at temperatures above the ice crystal forming temperature will hereinafter be referred to as "insolubles."

Accordingly, an object of our invention is to provide an improved aqueous crystallization process and apparatus therefor.

Another object of our invention is to provide a process and apparatus for the removal of insolubles formed in an aqueous crystallization process.

Another object of our invention is to provide a process and apparatus for the removal of insolubles formed in an aqueous multi-component mixture when said mixture is cooled to a temperature near the ice crystal forming temperature of said mixture.

Other objects, advantages and features of our invention will be readily apparent to those skilled in the art from the following description, the drawing and appended claims.

Broadly, our invention comprises cooling an aqueous multi-component mixture and separating the formed insolubles at a temperature near the ice crystal forming temperature. The insoluble-free mixture is then cooled so as to form a slurry comprising ice crystals and mother liquor, and the mother liquor separated from the ice crystals in a subsequent purification process step.

The invention is applicable to aqueous multi-component mixtures broadly. The invention is particularly applicable to those aqueous multi-component mixtures classified as beverages. In a first embodiment of the invention, the aqueous multi-component mixture is cooled and the formed insolubles separated from said mixture by filtration, centrifugation and the like to a temperature slightly above the ice crystal forming temperature.

In a second embodiment, the aqueous multi-component mixture is cooled to a temperature below the ice crystal forming temperature so as to form a minor portion of ice crystals within the said mixture. The formed ice crystals are employed to encourage coagulation of the precipitated insolubles and the said mixture is then warmed to a temperature slightly above the initial water freezing point and filtered to remove the insolubles therefrom. It is also within the scope of the invention to mix the mixture containing ice crystals and precipitated insolubles so as to encourage coagulation of the said insolubles.

It has further been discovered that in the filtration of the formed insolubles from the feed mixture improved separation is effected by employing a conventional filter aid or precoat such as diatomaceous earth, kieselguhr, fuller's earth, asbestos, sawdust, etc. When the pressure drop across the filter becomes excessive indicating a reduced filter capacity, water can be passed into the filter to dissolve the precipitated insolubles and to remove the insolubles from the filter. In order to minimize product contamination, it is preferred that the water employed to wash the filter comprise a portion of the water obtained upon melting a portion of the separated ice crystals recovered from the crystallization zone.

In the separation of the insolubles from an aqueous multi-component liquid mixture, the said mixture is cooled to a temperature near the ice crystal forming temperature. When operating according to the first embodiment, the liquid multi-component mixture is cooled and the formed insolubles separated from the said mixture at a temperature slightly above the ice crystal forming temperature of the said mixture, preferably at a temperature between the ice crystal forming temperature and a temperature not more than 10° F. above said ice crystal forming temperature. It has been discovered that maximum separation of the formed insolubles from the liquid multi-component mixture is effected when the temperature of the separation zone is maintained not more than 2° F. above the ice crystal forming temperature of the said multi-component mixture.

When operating according to the above-described second embodiment, the aqueous multi-component liquid mixture is cooled to a temperature slightly below the ice crystal forming temperature of the said mixture, preferably to a temperature not more than 5° below the ice crystal forming temperature. Upon the formation of ice crystals and the coagulation of the formed insolubles, the mixture is heated to a temperature not more than 10° above the ice crystal forming temperature, preferably to a temperature not more than 2° F. above the said ice crystal forming temperature.

When operating according to either the first or second embodiment, the formed insolubles can be separated from the liquid multi-component mixture by filtration, centrifugation, or other conventional means of separating solids from liquids.

FIGURE 1 is a schematic representation of one embodiment of the invention, and FIGURE 2 is a schematic representation of a modification of a portion of FIGURE 1.

The invention will hereinafter be described as it is applied to the concentration of beer although it is not intended that the invention should be limited to the specific embodiments described therein.

Referring to the drawing, beer comprising 3.6 weight percent ethyl alcohol, 5.5 weight percent sugars and 90.9 weight percent water is passed via conduit means 10 to a cooling zone 11. Cooling zone 11 can comprise a conventional U-tube heat exchanger or other means of cooling the feed passed to the cooling zone 11. Within cooling zone 11 the beer feed is cooled to a temperature of 24° F. The ice crystal forming temperature of the beer feed to cooling zone 11 as previously determined is 28.6° F. The cooled feed mixture containing formed organic insolubles is passed via conduit means 12 to a separation zone 13.

As previously noted, separation zone 13 can comprise a filter, centrifuge or other means of conventionally separating solid materials from a liquid feed. The solids are separated from the liquid feed at a temperature of 30° F. The beer feed substantially free of solids is withdrawn from separation zone 16 and passed to a chiller 17. The separated solids are withdrawn from separation zone 13 via conduit means 14.

When separation zone 13 comprises a filter, the filter can be washed by passing water to separation zone 13 via conduit means 18 at a temperature sufficiently above the separation temperature so as to dissolve the formed insolubles, and the water containing insolubles is withdrawn from separation zone 13 via conduit means 14. Preferably, although not to be limited thereto, when separation zone 11 comprises a filter, the filter contains a conventional filter aid or precoat such as diatomaceous earth, kieselguhr, asbestos, sawdust, etc.

Chiller 17 can comprise a conventional means, such as a scraped surface chiller, for chilling the feed mixture so as to form a slurry comprised of ice crystals and mother liquor. As illustrated, chiller 17 is surrounded by a cooling jacket 19 having a coolant inlet conduit 20 and a coolant outlet conduit 21. Within chiller 17, ice crystals are formed thereby forming a slurry which contains normally from about 20 to about 60 weight percent solids. While it is desirable to concentrate as much as possible the formation of crystal solids, if the solids content is too high the slurry becomes quite stiff and becomes too difficult to pass from the chiller. A final chilling temperature normally in the range 24 to 0° F. is obtained with chiller 17.

The slurry of ice crystals and adhering mother liquor is withdrawn from chiller 17 via conduit means 22 and passed to crystal purification column 23. Crystal purification column 23 can be a piston-type column substantially as described in the patent to Schmidt, Re. 23,810, or a pulse-type column as herein illustrated and described in the patent to R. W. Thomas, U.S. 2,854,494, with specific modifications as hereinafter described. In either type of column, a compacted mass of crystals is forced through the column; a filter section 24 is provided in an intermediate region of purification column 23 so that mother liquor can be withdrawn from the column and separated from the crystals; and the compacted mass of crystals is refluxed with a liquid passed countercurrently through the mass of crystals. Whereas the purification column of Schmidt and the purification column of Thomas provide a means for heating the crystal mass in the downstream region of the column, thereby providing a reflux liquid and providing for the withdrawal of the crystals from the purification column as a liquid melt, it is also within the scope of this invention to provide a method and apparatus for withdrawing the formed crystals from purification column 23 without transforming the solid crystals to liquid melt. Under these conditions, reflux liquid from a source external to the purification column is passed through the purification column countercurrent to the movement of the crystal mass. However, as illustrated, column 23 is provided with a means of melting the crystals in the downstream region of said column by passing a heating medium via conduit means 26 to column 23 and withdrawing the heating medium from column 23 via conduit means 27.

Downstream of the filter section 24, the mass of crystals is refluxed with the liquid (melted crystals) passed countercurrently through the mass of crystals as heretofore described. The mass of crystals moves through the reflux zone into the melt zone wherein said crystals are melted as hereinbefore described. A portion of the melted crystals is passed countercurrent to the moving mass of crystals in the heretofore described manner, and the remainder of the melted crystals is withdrawn from the melt zone via conduit means 28. As illustrated, purification column 23 is a pulse-type column having a pulse unit 29. A portion of the melted crystals can be passed to separation zone 13 as previously described.

Although a purification column has herein been illustrated, it is also within the scope of this invention to employ a conventional centrifuge or filter to effect the separation of mother liquor from the crystals formed in freezer 11. The remainder of the process is as heretofore described.

A concentrated beer comprising 6.6 weight percent ethyl alcohol, 9.2 weight percent sugars, and 84.2 weight percent water is withdrawn from purification column 23 and filter zone 24 via conduit means 30. Melted ice crystals are withdrawn from purification column 23 via conduit means 28. Wherein separation zone 13 comprises a filter, a portion of the melted ice crystals can be recycled to separation zone 13 via conduit means 18 in the heretofore described manner.

Although only a single stage crystallization process has herein been illustrated, the inventive process is particularly applicable to a multi-stage crystallization process employed to concentrate aqueous solutions. The problem of formed insolubles becomes increasingly acute in successive crystallization stages as the concentration of water in the crystallization feed is lowered. By employing the inventive insoluble forming and separation steps between successive crystallization stages, improved crystallization and separation of the formed crystals from the liquid feed mixture are effected.

Referring now to FIGURE 2, wherein elements corresponding to elements of FIGURE 1 are designated by the same number with the suffix "a," the feed is cooled in cooling zone 11a to a temperature slightly below the ice crystal forming temperature of the feed, preferably to a temperature not more than 5° F. below said ice crystal forming temperature, to form some ice crystals to aid in coagulation of the insolubles. The thus cooled effluent from chiller 11a is passed by way of conduit 12a to heating zone 31, wherein the cooled feed is heated to a temperature not more than 10° F. above said ice crystal forming temperature. The thus warmed feed is passed by way of conduit 32 to separation zone 13a wherein separation of the insolubles from the remaining liquid can be effected as described with respect to FIGURE 1.

Various modifications of the invention can be made, or followed, in view of the foregoing disclosure, without departing from the spirit or scope thereof.

We claim:

1. A process which comprises cooling beer, and separating formed insolubles at a temperature between the ice crystal forming temperature and a temperature not more than 10° F. above said ice crystal forming temperature by filtering insolubles from the remaining liquid in a filtering zone, cooling said remaining liquid to a slurry of ice crystals and mother liquor, passing said slurry to a filtration zone, withdrawing mother liquor from said filtration zone, passing separated crystals from said filtration zone through a purification zone to a melt zone, melting crystals within said melt zone, passing a portion of said melted crystals to said purification zone, withdrawing the remainder of said melted crystals from said melt zone, and contacting the filtered insolubles with a portion of said remainder of said melted crystals so as to dissolve and remove said insolubles from the filtering zone.

2. A process for the separation of at least a portion of the water from an aqueous multi-component mixture which contains at least one component which forms insolubles at a temperature above the ice crystal forming temperature for said mixture, which comprises cooling said mixture to a first temperature above said ice crystal forming temperature to cause the formation of insolubles, separating the thus formed insolubles from the remaining liquid, further cooling said remining liquid to a second temperature below said ice crystal forming temperature to form a slurry of ice crystals and mother liquor, and separating said ice crystals from said mother liquor.

3. A process in accordance with claim 2 wherein said first temperature is not more than 10° F. above said ice crystal forming temperature.

4. A process in acordance with claim 2 wherein said mixture is a beverage and wherein said first temperature is not more than 2° F. above said ice crystal forming temperature.

5. A process in accordance with claim 2 wherein the step of separating said ice crystals from said mother liquor comprises passing said slurry to a filtration zone, withdrawing mother liquor from said slurry in said filtration zone leaving separated crystals, passing separated crystals from said filtration zone through a purification zone to a melt zone, melting crystals within said melt zone to produce melt, passing a portion of said melt to said purification zone, and withdrawing the remainder of said melt from said melt zone.

6. A process in accordance with claim 5 wherein said first temperature is not more than 10° F. above said ice crystal forming temperature.

7. A process in accordance with claim 2 wherein the step of separating the insolubles from the remaining liquid comprises passing the cooled mixture containing the insolubles to a filtration zone and therein filtering said insolubles from the remaining liquid; and further comprising melting at least a portion of the ice crystals separated from said mother liquor to form melt, and passing at least a portion of said melt to said filtering zone and therein contacting the filtered insolubles with said portion of said melt so as to dissolve and remove said insolubles from said filtering zone.

8. A process in accordance with claim 2 wherein the step of cooling said mixture to a first temperature comprises cooling said mixture to a third temperature below said ice crystal forming temperature and then heating the thus cooled mixture to said first temperature.

9. A process in accordance with claim 8 wherein said third temperature is not more than 5° F. below said ice crystal forming temperature and said first temperature is not more than 10° F. above said ice crystal forming temperature.

10. A process in accordance with claim 9 wherein said first temperature is not more than 2° F. above said ice crystal forming temperature.

11. A proces sin accordance with claim 10 wherein said mixture is beer.

References Cited

UNITED STATES PATENTS

| | | | |
|---|---|---|---|
| 2,851,368 | 9/1958 | Findlay | 99—205 |
| 2,921,682 | 1/1960 | White. | |
| 2,979,453 | 4/1961 | Kiersted. | |
| 3,050,953 | 10/1962 | Wilson | 62—1958 |
| 3,067,270 | 12/1962 | Weedman. | |
| 3,155,610 | 11/1964 | Williams | 62—58 X |

NORMAN YUDKOFF, *Primary Examiner.*